US006856605B1

United States Patent
Larghi et al.

(10) Patent No.: US 6,856,605 B1
(45) Date of Patent: Feb. 15, 2005

(54) SYSTEM AND METHOD FOR CONTROLLING AN END-USER APPLICATION AMONG A PLURALITY OF COMMUNICATION UNITS IN A WIRELESS MESSAGING NETWORK

(75) Inventors: Stephen Larghi, Keller, TX (US);
Thomas J. Cook, Vancouver, WA (US);
Allan D. Angus, Bedford, TX (US);
Donna Regenbaum, Dallas, TX (US)

(73) Assignee: Metrocall, Inc., Alexandria, VA (US)

( * ) Notice: Subject to any disclaimer, the term of this patent is extended or adjusted under 35 U.S.C. 154(b) by 0 days.

(21) Appl. No.: 09/387,480

(22) Filed: Sep. 1, 1999

Related U.S. Application Data

(60) Provisional application No. 60/098,873, filed on Sep. 1, 1998.

(51) Int. Cl.[7] .................................. H04Q 7/20
(52) U.S. Cl. ...................... 370/313; 370/349; 340/7.21
(58) Field of Search ............................... 370/313, 345, 370/349; 340/7.21

(56) References Cited

U.S. PATENT DOCUMENTS

| | | | |
|---|---|---|---|
| 5,153,582 A | * 10/1992 | Davis ........................ | 340/7.23 |
| 5,671,436 A | 9/1997 | Morris et al. ............... | 395/800 |
| 5,706,435 A | 1/1998 | Barbará et al. ............. | 395/200 |
| 5,712,624 A | * 1/1998 | Ayerst et al. .......... | 340/825.21 |
| 5,754,119 A | * 5/1998 | Deluca et al. ............ | 340/7.21 |
| 5,862,325 A | 1/1999 | Reed et al. ............ | 395/200.31 |
| 6,104,936 A | 8/2000 | Kronestedt .................. | 455/562 |
| 6,282,434 B1 | * 8/2001 | Johannisson et al. .... | 455/562.1 |
| 2002/0041238 A1 | * 4/2002 | Johnson et al. ........ | 340/870.28 |

* cited by examiner

Primary Examiner—Melvin Marcelo
(74) Attorney, Agent, or Firm—Venable LLP

(57) ABSTRACT

There is disclosed an application controller for use with a two-way wireless messaging system. The application controller is distributed, at least in part, among a plurality communication units associated with the two-way wireless messaging system. The application controller is capable of controlling cooperative communication among ones of the communication units in accordance with a prescribed application task, and comprises a data repository, first and second communication controllers, and an operations controller. The data repository maintains at least one subscriber profile. The first communication unit controller senses change in a characteristic monitored at a first communication unit, wherein the monitored characteristic is evaluated in accordance with the prescribed application task, and, in response thereto, automatically causes the first communication unit to transmit a first data signal. The operations controller analyzes the first data signal in accordance with the prescribed application task using the at least one subscriber profile, and, in response thereto, causes a second data signal to be communicated automatically to at least a second communication unit. The second communication unit controller automatically analyzes the second data signal at the second communication unit, and, in response thereto, transmits an acknowledgment signal to at least said first communication unit.

40 Claims, 8 Drawing Sheets

SYSTEM AND METHOD FOR CONTROLLING AN END-USER APPLICATION AMONG A PLURALITY OF COMMUNICATION UNITS IN A WIRELESS MESSAGING NETWORK

This application claims the benefit of provisional. No. 60/098,873 filed. Sep. 1, 1998.

CROSS-REFERENCE TO RELATED APPLICATIONS

The present invention is related to those disclosed in the following. United. States. Patent. Applications:

1. Ser. No. 09/002,191, filed. Dec. 31, 1997, entitled "ANTENNA SYSTEM FOR NARROWBAND COMMUNICATIONS SYSTEMS AND METHOD OF OPERATION" now U.S. Pat. No. 6,097,970;
2. Ser. No. 09/001,717, filed. Dec. 31, 1997, entitled "CONTROLLER FOR USE WITH COMMUNICATIONS SYSTEMS FOR CONVERTING A VOICE MESSAGE TO A TEXT MESSAGE" now U.S. Pat. No. 6,198,808;
3. Ser. No. 09/001,759, filed. Dec. 31, 1997, entitled "SYSTEM FOR SCHEDULING REVERSE-CHANNEL MESSAGES IN NARROWBAND COMMUNICATIONS SYSTEMS AND METHODS OF OPERATION" now U.S. Pat. No. 6,097,969;
4. Ser. No. 09/138,438, filed Aug. 21, 1998, entitled "SYSTEM AND METHOD FOR MODELING SIMULCAST DELAY SPREAD AND OPTIMIZING LAUNCH DELAYS" now U.S. Pat. No. 6,097,930;
5. Provisional Ser. No. 60/098,873, filed Sep. 1, 1998, entitled "NARROWBAND TELEMETRY SYSTEM AND METHODS OF OPERATION";
6. Ser. No. 09/87,470, filed concurrently herewith, entitled "SYSTEM AND METHOD FOR CONTROLLING TRANSMITTER POWER OF A NARROWBAND ADVANCED MESSAGING SYSTEM" now U.S. Pat. No. 6,697,976;
7. Ser. No. 09/388,255, filed concurrently herewith, entitled "SYSTEM AND METHOD FOR TRANSMITTING SUBSCRIBER DATA IN A NARROWBAND ADVANCED MESSAGING SYSTEM USING UNSCHEDULED MESSAGE TIME SLOTS"; and
8. Ser. No. 09/387,463, filed concurrently herewith, entitled "SYSTEM AND METHOD FOR OVER-THE-AIR REPROGRAMMING OF AN ADVANCED WIRELESS MESSAGING DEVICE".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless communication systems and methods of operating the same and, in particular, to systems and methods for controlling an end-user application distributed among a plurality of communication units in a narrowband wireless messaging network.

BACKGROUND OF THE INVENTION

The demand for better and cheaper wireless communication services and equipment continues to grow at a rapid pace. Much of this growth is spurred by the Federal Communication Commission's ("FCC") approval of certain frequency bands for the next generation of Personal Communication Service ("PCS") devices that provide advanced voice and/or data messaging services, as well as voice telephone services. A relatively small portion of the available frequency bands was set aside for narrowband PCS ("NPCS") to encourage efficient use of the available spectrum.

To maximum use of the NPCS spectrum, wireless service providers are making new services available to subscribers beyond traditional paging services. These advanced wireless messaging services include two-way paging, voice messages, telemetry applications, e-mail applications, news information, and other end-user applications that are typically regarded as desktop personal computer (PC) applications or cellular telephone applications. These advanced wireless messaging services are instead performed via a subscriber communication unit owned by the end-user, such as a two-way paging device or a telemetry device. These advanced wireless messaging services attract more subscribers and increase use by existing subscribers.

Unfortunately, these advanced wireless messaging services generally are single-user oriented applications. There is a lack of advanced wireless messaging services and devices that enable cooperation among two or more end users (or subscribers) for the purposes of, for example, executing a common application or sharing data entered or modified by one end user.

There is therefore a need in the art for new end-user applications for use in advanced wireless messaging systems. In particular, there is a need for advanced wireless messaging systems and/or end-user applications capable of allowing cooperative communication across an NPCS wireless messaging network between two or more end users. More particularly, there is a need for advanced wireless messaging systems and/or end-user applications that allow a subscriber to enter commands or to modify data in a subscriber communication unit and then transmit the commands or modified data via the wireless messaging network to one or more other end-user devices that then may respond via the wireless messaging network.

SUMMARY OF THE INVENTION

To address the above-discussed deficiencies of the prior art, it is a primary object of the present invention to provide, for use in a two-way wireless messaging system, an application controller distributed, at least in part, among a plurality communication units associated with the two-way wireless messaging system, wherein the application controller is capable of controlling cooperative communication among ones of the plurality of communication units in accordance with a prescribed application task. In an advantageous embodiment, the application controller comprises: 1) a first communication unfit controller that senses change in a characteristic monitored at a first communication unit, the monitored characteristic evaluated in accordance with the prescribed application task, and, in response thereto, automatically causes the first communication unit to transmit a first data signal; 2) an operations controller that analyzes the first data signal in accordance with the prescribed application task using at least one subscriber profile, and, in response thereto, causes a second data signal to be communicated automatically to at least a second communication unit; and 3) a second communication unit controller that automatically analyzes the second data signal at the second communication unit, and, in response thereto, transmits an acknowledgment signal to at least the first communication unit.

In one embodiment of the present invention, the two-way wireless messaging system includes at least one base station that communicates with at least one of the first communication unit and the second communication unit.

In another embodiment of the present invention, the at least one base station comprises 1) a transmitter that is capable of transmitting messages in a forward-channel having a first frequency range; 2) a receiver that is capable of receiving messages in a reverse-channel having a second frequency range; and 3) an antenna that is capable of transmitting the forward-channel messages at a first angle of electrical downtilt below horizon and receiving the reverse-channel messages at a second angle of electrical downtilt, wherein the second angle of electrical downtilt is less than the first angle of electrical downtilt.

In still another embodiment of the present invention, the second data signal is communicated automatically to the second communication unit and at least a third communication unit.

In yet another embodiment of the present invention, the second data signal is communicated concurrently to the second communication unit and the third communication unit.

According to one embodiment of the present invention, the second communication unit transmits the acknowledgment signal to the first communication unit and the third communication unit.

According to another embodiment of the present invention, the acknowledgment signal is transmitted concurrently to the first communication unit and the third communication unit.

According to a further embodiment of the present invention, the prescribed application task is one of a calendering task, an environmental monitoring task, an automation task, and a security task.

According to a still further embodiment of the present invention, the prescribed application task is one of a calendering task, an environmental monitoring task, an automation task, and a security task.

According to a yet further embodiment of the present invention, the operations controller is associated with a data repository that maintains the at least one subscriber profile.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless messaging network.

Figure 1:
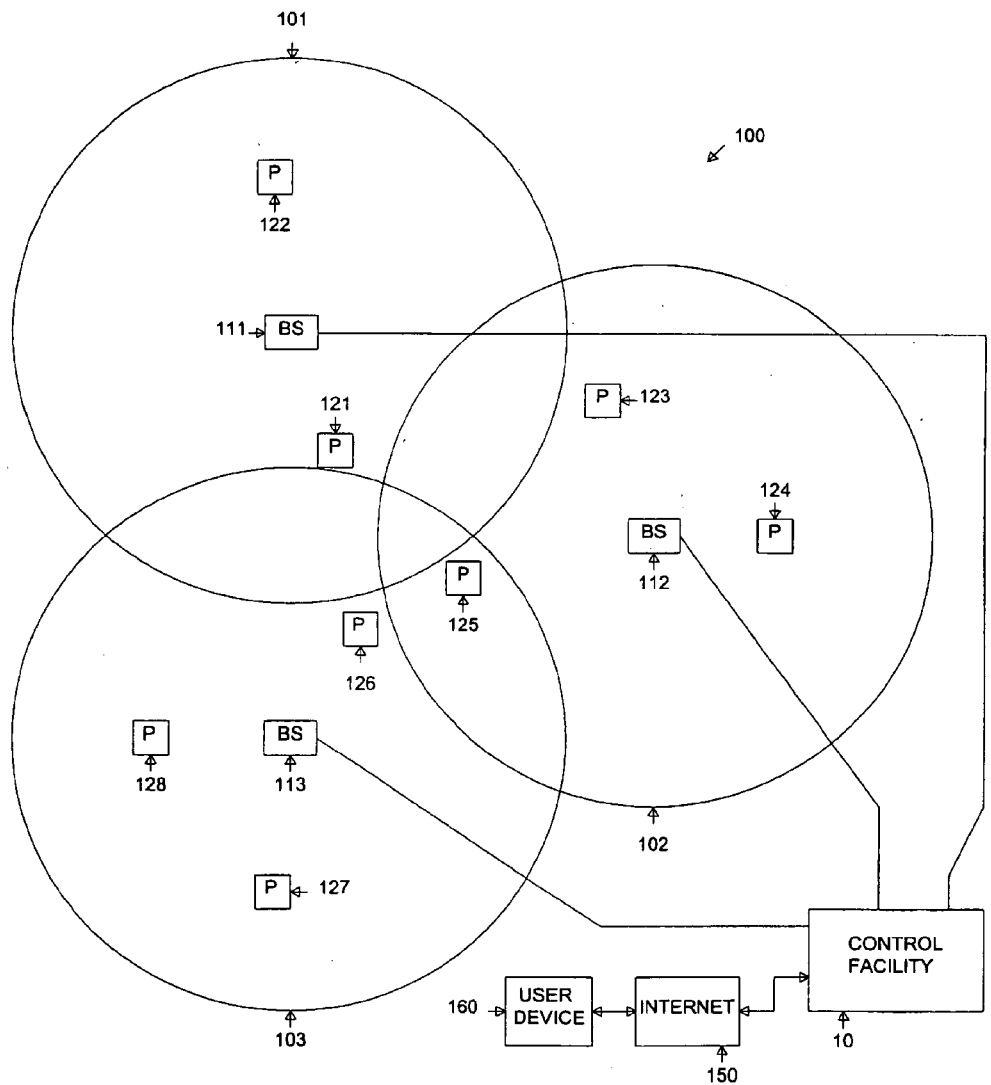
FIG. 1 illustrates a portion of an exemplary messaging network according to one embodiment of the invention.

Turning initially to FIG. 1, there is illustrated a representative portion of a conventional messaging network (generally designated "100" and referred to below as "network 100"). Network 100 provides two-way data messages to subscribers (or users) of network 100. Network 100 is represented by three exemplary fixed land sites, called base stations, which communicate with a plurality of subscriber communication units 121–128 (e.g., message pagers, telemetry devices, PCS devices, personal data assistants, or other processing systems that include wireless communication capability, etc.) within network 100.

Base stations 111, 112 and 113, each labeled "BS" in FIG. 1, have coverage areas 101, 102, and 103, respectively, that are determined by the power of the transmitters in base stations 111, 112, and 113. For the purposes of illustration and discussion, coverage areas 101, 102, and 103 are shown as circles. In real world environments, however, each of coverage areas 101, 102, and 103 may differ significantly from an idealized circular form.

For purposes of illustration, a plurality of subscriber communication units, each labeled "P" in FIG. 1, are shown scattered throughout messaging network 100. Subscriber communication units 121 and 122 are located within coverage area 101 and may engage in two-way messaging with base station 111. Subscriber communication units 123 and 124 are located in coverage area 102 and may engage in two-way messaging with base station 112. Subscriber communication units 126, 127 and 128 are located in coverage area 103 and may engage in two-way messaging with base station 113. Subscriber communication unit 125 is located in coverage areas 102 and 103 and may engage in two-way messaging with base stations 112 and 113.

In a NPCS environment, base stations 111, 112, and 113 transmit signals in a forward-channel, such as from 939–940 MHZ, for example. Base stations 111, 112, and 113 receive signals in a reverse-channel at, for example, 901–902 MHZ. Each base station is effectively a transceiver that contains a transmitter and a receiver for carrying out two-way communications. Each subscriber communication unit receives forward-channel messages directed to it at a selected frequency within the forward-channel. Each communication also transmits reverse-channel messages at a selected frequency within the reverse-channel.

Messaging network 100 may be, for example, a two-way wireless messaging system compatible with the MOTOROLA® ReFLEX™ transport protocol. The ReFLEX™ protocol may be used to send a message to a subscriber communication unit. The subscriber communication unit may then transmit in the reverse-channel an automatic acknowledgment message that does not require subscriber action. Alternatively, the ReFLEX™ protocol may be used in an enhanced messaging mode to send a more complex message to the subscriber communication unit. The subscriber communication unit may then transmit in the reverse-channel an automatic acknowledgment message that does not require subscriber action. Some time later, the subscriber may transmit a "canned" message stored in the subscriber communication unit, such as "Will Call You Later", or a unique message composed by the subscriber using a keypad on the subscriber communication unit.

Base station 111 transmits messages to subscriber communication units in coverage area 101. Base station 112 transmits messages to subscriber communication units in coverage area 102. Base station 113 transmits messages to subscriber communication units in coverage area 103. Base stations 111–113 may be associated with one another and to a control facility 10 by a wired backbone, such as a proprietary fiber-optic network. In alternate embodiments, base stations 111–113 may be associated with one another and to control facility 10 by a satellite communications link, such as through a very small aperture terminal ("VSAT").

It should be noted that while the illustrated embodiment discloses centralized control facility 10 for controlling communication among the exemplary subscriber communication units, in alternate advantageous embodiments communications control may be distributed. It should also be noted that messages may be received into control facility 10 from a variety of sources. Some messages may be received from a public telephone system in the form of simple call-back numbers entered by a caller on a DTMF keypad. Other messages may be transmitted by or received by control facility 10 to or from end-user device 160 via Internet 150, or alternatively via a privately owned intranet. End-user device 160 may be, for example, a desktop PC.

Figure 2:
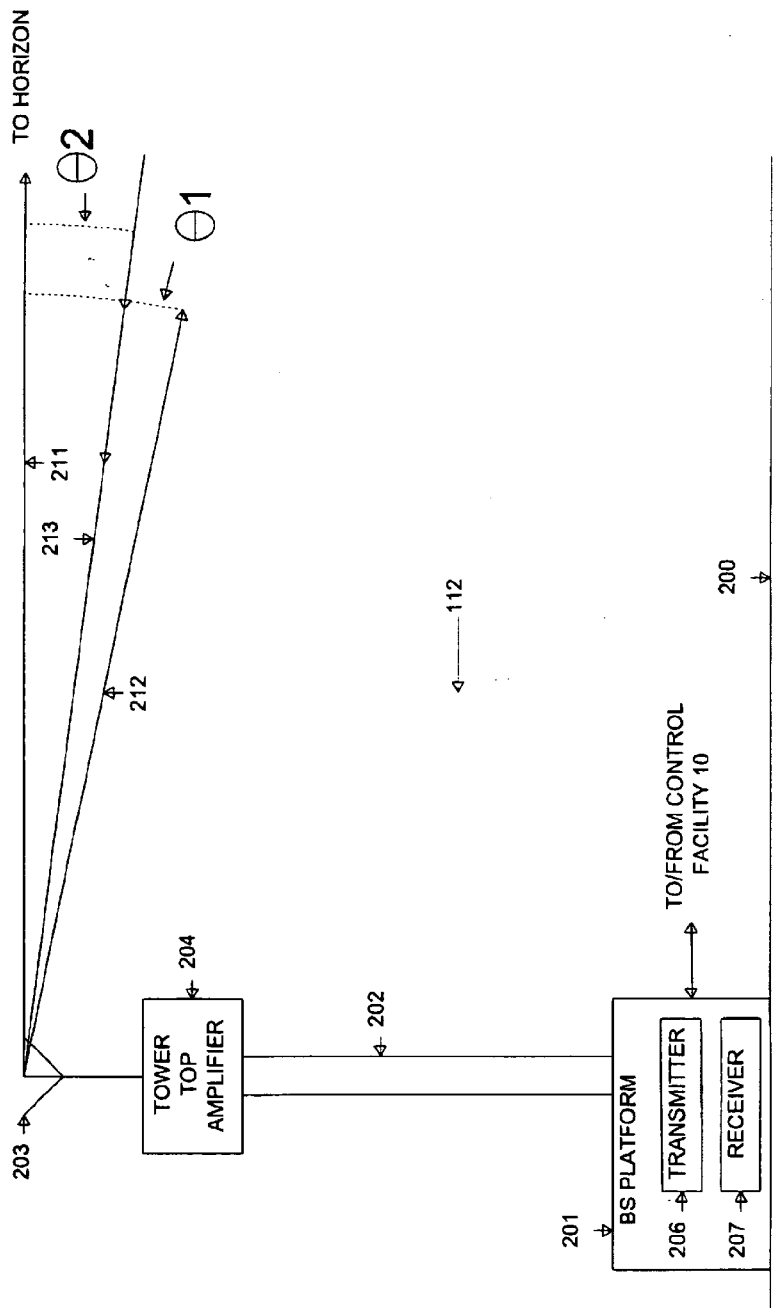
FIG. 2 illustrates forward and reverse-channels associated with base station 112 in one embodiment of the invention.

In an advantageous embodiment of the present invention, base station 112 has an antenna for transmitting and receiving at different angles of electrical downtilt, as described in U.S. patent application Ser. No. 09/002,191, incorporated by reference above. FIG. 2 illustrates forward and reverse-channels associated with base station 112 in accordance with an exemplary embodiment of the present invention. Base station 112 comprises base station (BS) platform 201 and tower 202 for holding antenna 203 in an elevated position above ground 200. Base station 112 comprises transmitter 206 for transmitting messages in the forward-channel and receiver 207 for receiving messages in the reverse-channel. The forward and reverse-channel messages are appropriately transferred to or from a central control facility 10 (not shown). Tower-top amplifier 204 may optionally be included to strengthen received signals at antenna 203 before transferring the received signals to receiver 207, providing the means for compensating for line losses which occur on long cables between the antenna and the receiver.

Although the remainder of the discussion of the exemplary embodiment focuses on base station 112, it should be noted that this is by way of illustration only, and that the following discussion applies with equal force to the other base stations and receivers in the improved messaging network.

Reference beam 211 is a horizontal reference axis indicating the relative position of the horizon. Antenna 203 employs electrical downtilt to transmit messages in the forward-channel along transmit beam 212. Transmit beam 212 represents the direction of travel with respect to the horizon of the main power lobe transmitted by antenna 203. As FIG. 2 indicates, transmit beam 212 is transmitted below the horizon at a downtilt angle $\theta 1$. The downtilt angle $\theta 1$ is determined by the electrical characteristics of antenna 203 and is dependent on the transmission frequency of the forward-channel.

Antenna 203 also employs electrical downtilt to receive messages in the reverse channel along receive beam 213. Receive beam 213 represents the direction of travel with respect to the horizon of an incident signal transmitted from a subscriber communication unit located at an optimum distance away from antenna 203. Antenna 203 has been optimized to amplify signals received from subscriber communication units at the optimum distance. The downtilt angle $\theta 2$ is determined by the electrical characteristics of antenna 203 and is dependent on the transmission frequency of the reverse channel.

However, unlike prior art messaging networks, the downtilt angle $\theta 2$ of receive beam 213 is above the downtilt angle $\theta 1$ of transmit beam 212. Furthermore, in a preferred embodiment of the present invention, the downtilt angle $\theta 2$ of receive beam 213 is only slightly below the horizon. In other embodiments of the present invention, the downtilt angle $\theta 2$ of receive beam 213 may be oriented directly at the horizon. The use of a smaller angle of electrical downtilt in the reverse channel in antenna 203 focuses antenna 203 on incoming signals from more distant subscriber communication units, including those beyond the boundaries of the forward channel coverage area in which base station 112 resides. This type of antenna pattern optimization increases the probability that antenna 203 will receive reverse-channel signals from remote subscriber communication units in other coverage areas, thereby increasing the overall macro-diversity of the antennas in the network.

The present invention optimizes antenna 203 for the amplification of signals from remote subscriber communication units, and, thereby, maximizes antenna macro-diversity effects, under the assumption that although antenna 203 may occasionally lose the signal from a nearby subscriber communication unit due to blocking or multipath fading, at least one other less close antenna will properly receive the subscriber communication unit's "lost" signal because the less close base station antenna has also been optimized to amplify the signal of remote subscriber communication units. Maximizing the ability of more remote base station receivers to receive the subscriber communication unit's transmissions improves the overall performance of the network. If a reverse channel signal from a single subscriber unit is detected by multiple receivers in wireless network, control facility 10 is capable of adding the received signals together to form a composite signal and/or select whichever one of the multiple copies of the reverse channel signal is best received.

Subscriber communication units 121–128 are capable of performing a variety of end-user applications, including, but not limited to, telemetry applications, personal calendar applications, home/office automation applications. The present invention provides distributed control over the end-user application in order to allow two or more of subscriber communication units 121–128 to execute the application together across wireless network 100. The present invention also provides distributed control over the end-user application in order to allow at least one of subscriber communication units 121–128 and another end-user device, such as a desktop PC, to execute the application together across wireless network 100 and another data network, such as the Internet or a privately owned intranet.

Figure 3:
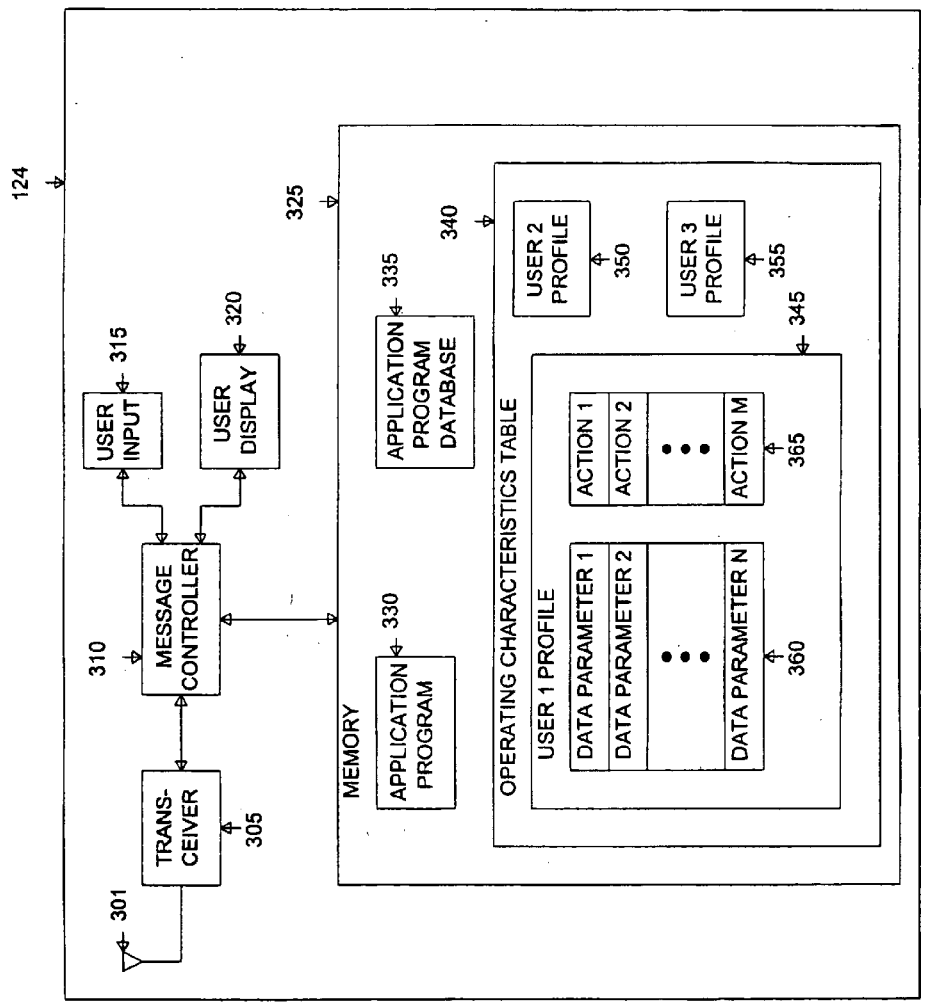
FIG. 3 illustrates an exemplary subscriber communication unit (SCU) according to one embodiment of the present invention.

FIG. 3 illustrates exemplary subscriber communication unit (SCU) 124 according to one embodiment of the present invention. SCU 124 comprises antenna 301, transceiver 305, message controller 310, user input 315, user display 320, and memory 325. Message controller 310, under the control of one or more application programs stored in memory 325, controls the overall operation of SCU 124, which in the illustrated embodiment is an advanced two-way messaging device capable of running, for example, an electronic calendar (or schedule) program, an e-mail program, or the like. A calendar program is used by a person to enter appointments, schedule tasks, coordinate meetings, and the like. There are a number of well-known electronic calendar programs commercially available, including Microsoft Outlook™.

Memory 325, which may be any known type of electronic or magnetic data repository, contains application program 325, application program database 335, and operating characteristics table 340. Operating characteristics table 340 contains user profiles 345, 350, and 355, referred to hereafter as User 1 Profile, User 2 Profile and User 3 Profile, respectively. In the illustrated embodiment, User 1 Profile contains data parameter list 360, which stores up to N data parameters, labeled Data Parameter 1 through Data Parameter N. User 1 Profile also comprises action list 365, which stores up to M executable actions defined by Subscriber 1 and labeled Action 1 through Action M. User 2 Profile and User 3 Profile are similar to User 1 Profile and need not be discussed separately. User 1 Profile is associated with a specific user, referred to herein as Subscriber 1, and User 2 Profile and User 3 Profile may be associated with other users of SCU 124 or with Subscriber 1 if Subscriber 1 requires different profiles for any reason.

Message controller 310 executes application program 330, which retrieves some or all of the user profile data found in operating characteristics table 340 from application program database 335. Application program database 335 also may contain configuration data used by message controller 310 to control user input device 315, user display 320, and/or transceiver 305. In an exemplary embodiment, user display 320 may be an LED device capable of displaying text and graphics to Subscriber 1. User input device 315 is a manually operated user interface, such as a small keyboard on SCU 124, or SCROLL and ENTER keys used to select items displayed on user display 320. When Subscriber 1 changes any of the data in operating characteristics table 340, the changed information is eventually saved to application program database 335.

SCU 124 communicates through wireless network 100 with, for example, SCU 123, or through wireless network 100 and internet 150 to communicate with user device 160 to jointly execute an end-user application according to the user profile of Subscriber 1 in SCU 124. The user profile comprises data and/or instructions that are executed by SCU 124 and at least one of SCU 123 and user device 160 to accomplish a certain task and to synchronize data shared among SCU 123, SCU 124 and/or user device 160.

In an exemplary embodiment, Subscriber 1 uses SCU 124 to run an electronic calendar. Subscriber 1 wants to automatically transmit changes that Subscriber 1 makes using SCU 124 to Subscriber 1's secretary, who operates a corresponding electronic calendar on user device 160, which in this case is a desktop PC. It also is Subscriber 1's desire to automatically transmit to SCU 123 changes that Subscriber 1 makes using SCU 124. A coworker operates a corresponding electronic calendar on SCU 123, which in this case is also two-way messaging device. In this manner, when Subscriber 1 adds a new appointment, deletes an old appointment, schedules a task, or the like, the changed information is automatically reflected in the electronic calendars used by the secretary and the coworker.

Message controller 310 receives data and/or commands that Subscriber 1 enters via user input device 315. Message controller 310 may display options on user display 320 that maybe selected by Subscriber 1 using, for example, SCROLL and ENTER keys. Alternatively, message controller 310 may receive alphanumeric text representing data and/or commands that are entered by Subscriber 1. Depending on the information entered or selected by Subscriber 1, message controller may modify one or more of Data Parameters 1–N, or execute one or more of Actions 1–M, or both, in User 1 Profile in operating characteristics table 345.

In an advantageous embodiment of the present invention, message controller 310 responds to any change in operating characteristics table 340 by determining one or more additional corresponding actions, if any, specified in User 1 Profile that must be executed in response to a given change. For example, if Subscriber 1 changes the time of a scheduled appointment and "Saves" the change, message controller 310 changes one of Data Parameter 1–N corresponding to the appointment time while performing the save action. In response to the change in the value of the data or the execution of a save action, or both, message controller 310 may automatically perform one or more subsequent actions specified by Subscriber 1 in User 1 Profile.

For example, Subscriber 1 may configure User 1 Profile so that message controller 310 transmits data parameters associated with all new or changed appointments in Subscriber 1's electronic calendar to user device 160, used by Subscriber 1's secretary, to Subscriber 1's office PC, and to SCU 123, used by a coworker. Additionally, Subscriber 1 may configure User 1 Profile so that message controller 310 transmits data parameters associated with all new or changed job tasks in Subscriber 1's electronic calendar only to Subscriber 1's office PC. As will be explained below in greater detail, user device 160 and SCU 123 execute corresponding electronic calendar programs that cooperate with application program 330 to maintain (or "synchronize") the data parameters related to the electronic calendaring program. User-device 160 and SCU 123 may also send data parameter changes to SCU 124 to reflect changes made to Subscriber 1's electronic calendar by Subscriber 1's secretary or coworker.

Figure 4A:
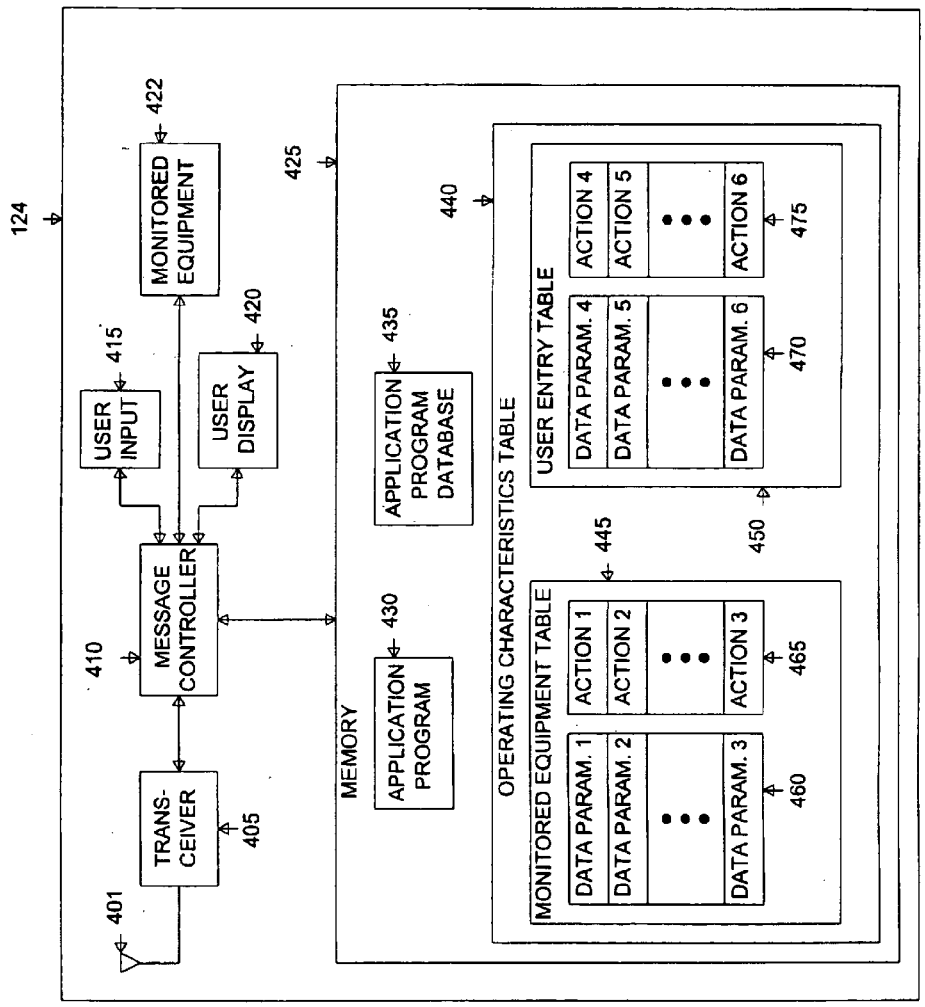
FIG. 4A illustrates an exemplary subscriber communication unit according to an alternate embodiment of the present invention used in a telemetry system.

FIG. 4A illustrates exemplary subscriber communication unit (SCU) 124 according to an alternate embodiment of the present invention used in a telemetry system. Telemetry systems, broadly stated, are communication systems that transmit "status" information from a remote process, function, or device (collectively, "telemetry application") to a monitoring facility ro device. Telemetry systems may be used in lieu of maintenance workers to remotely monitor a given telemetry application. In a telemetry application, a two-way wireless messaging device may be integrated in, or connected to, a piece of equipment to gather statistics, status information, alarms, and the like, and to communicate the gathered information (i.e., telemetry data) over a paging network to the monitoring facility.

SCU 124 comprises antenna 401, transceiver 405, message controller 410, optional user input 415, optional user display 420, monitored equipment 422, and memory 425. Message controller 410, under the control of one or more application programs stored in memory 425, controls the overall operation of SCU 124, which in the illustrated embodiment monitors commands, alarms, measured parameters, status messages, and the like, transmitted to or from monitored equipment 422. Monitored equipment 422 may be any one or more of, for example, a vending machine, remote electrical power generation equipment, a burglar or fire alarm system (i.e., a security system) in a home or office, a home heating system, a home sprinkler system, a utility meter, a vehicle locator, an environmental monitor, medical equipment, oil drilling equipment, and the like. The monitoring facility may be a beverage distributor, an energy production company, an alarm service company, another subscriber communication unit, such as SCU 123, a PC, such as user device 160, or the like.

Memory 425 contains application program 430, application program database 435, and operating characteristics table 440. Operating characteristics table 440 contains monitored equipment table 445 and user entry table 450. In the illustrated embodiment, monitored equipment table 445 contains data parameter list 460, which stores up to N data parameters, including Data Parameter 1, Data Parameter 2, and Data Parameter 3, and action list 465, which stores up to M executable actions defined for monitored equipment 422, including Action 1, Action 2 and Action 3. In an optional embodiment of the present invention, a user interface is included as part of SCU 124 in order to enter manually enter data and or command associated with monitored equipment 422. Optional user display 420 may be an LED device capable of displaying text and graphics to Subscriber 1. User input device 415 is a manually operated user interface, such as a small keyboard on SCU 124, or SCROLL and ENTER keys used to select items displayed on user display 420. In the illustrated embodiment, user entry table 450 contains data parameter list 470, which stores up to R data parameters, including Data Parameter 4, Data Parameter 5, and Data Parameter 6, and action list 475, which stores up to M executable actions defined for monitored equipment 422, including Action 4, Action 5, and Action 6.

Message controller 410 executes application program 430, which retrieves some or all of the telemetry and/or user entry data found in operating characteristics table 440 from 435. Application program database 435 also may contain configuration data used by message controller 410 to control user input device 415, user display 420, monitored equipment 422, and/or transceiver 405. When Subscriber 1 or monitored equipment 422 changes any of the data in operating characteristics table 440, the changed information is eventually saved to application program database 435.

Figure 4B:
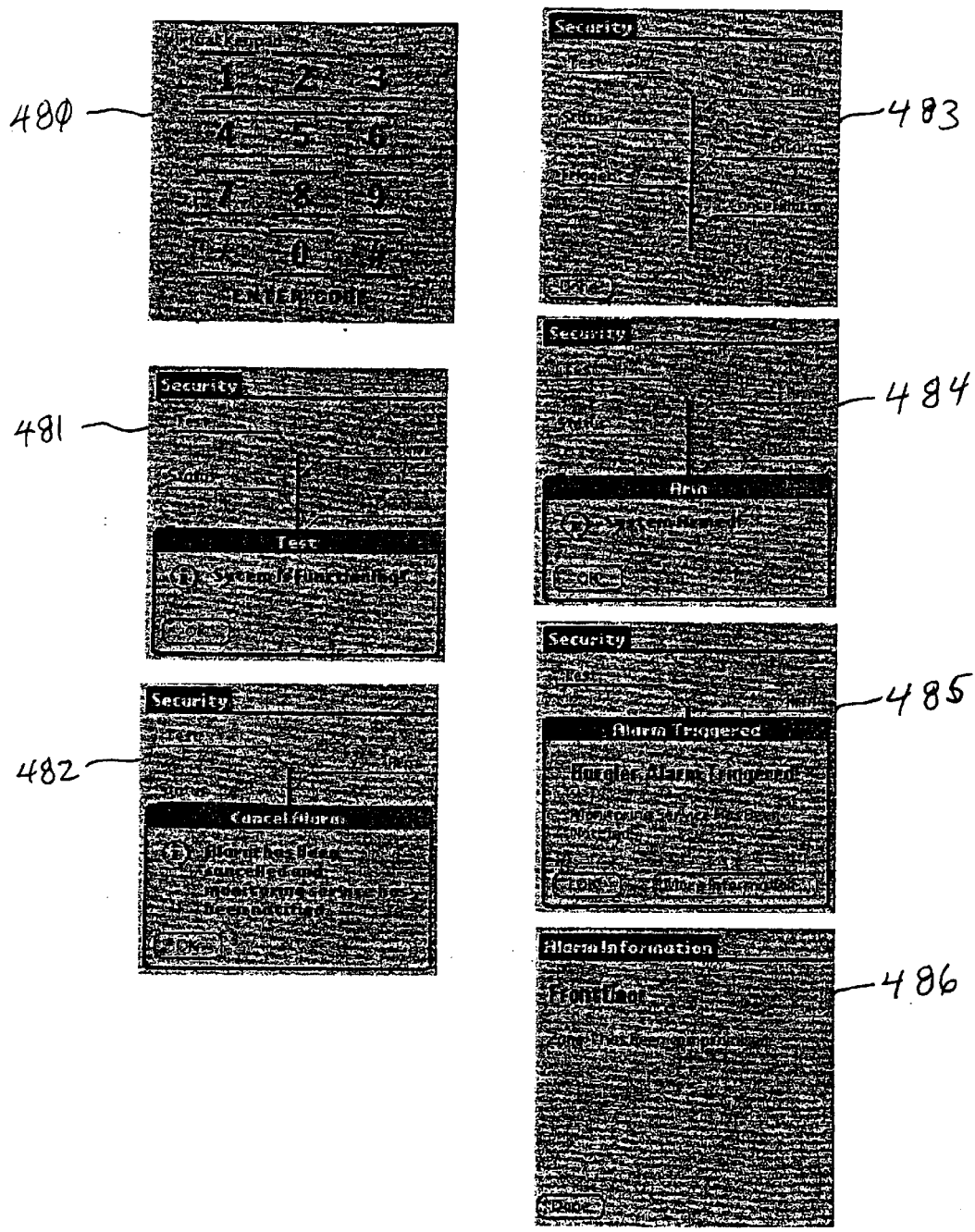
FIGS. 4B and 4C depict exemplary screen menus that may be used by a subscriber unit in a telemetry application.
Figure 4C:
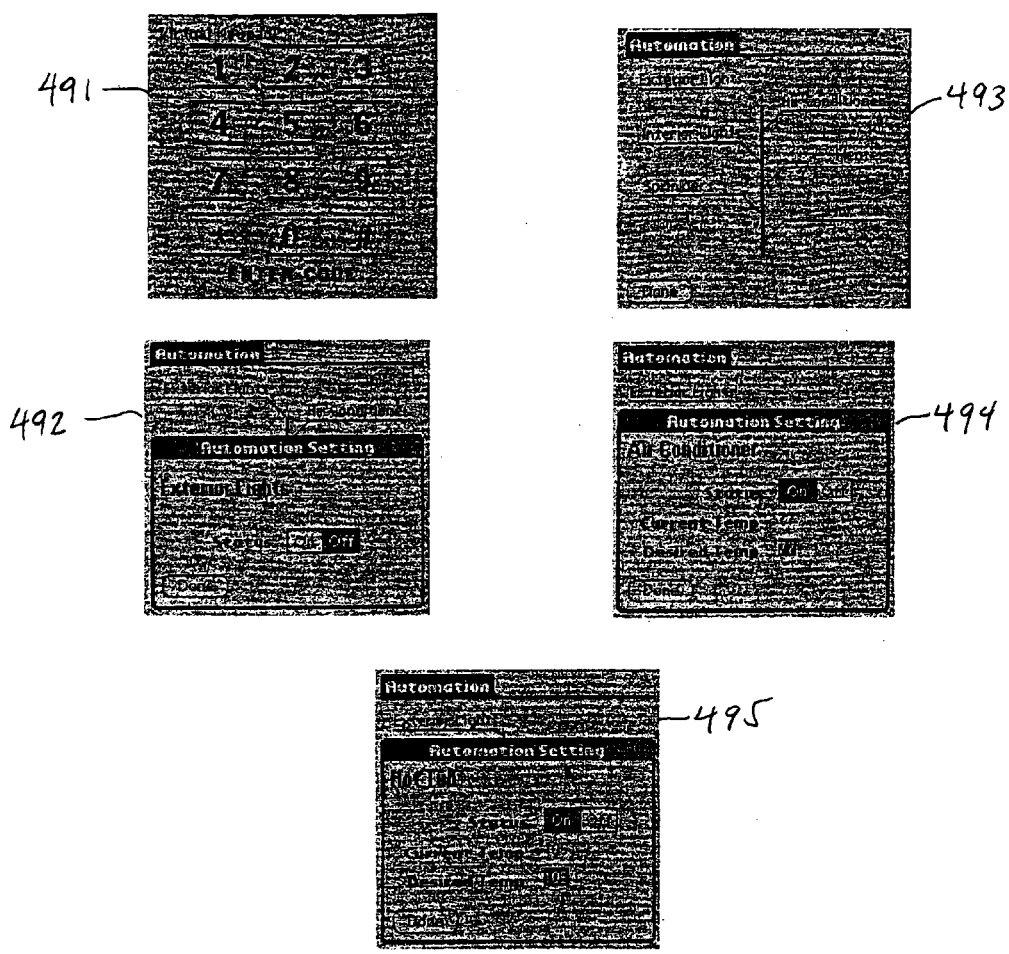

SCU 124 communicates through wireless network 100 with, for example, SCU 123, or through wireless network 100 and internet 150 to communicate with user device 160 to jointly execute the telemetry application according to the monitored equipment table 445. This allows a user of SCU 123 or user device 160, referred to hereafter as Subscriber 1, to remotely monitor and/or control the operation of monitored equipment 422 associated with SCU 124. In such an embodiment, SCU 123 (or user device 160) may use a series of menu-type screen displays to receive commands and display information to Subscriber 1 in order to facilitate such monitoring and control operations. FIGS. 4A and 4B depict exemplary screen menus that may be used by SCU 123 (or user device 160). Screens 480–486 are screen displays associated with an exemplary security alarm application. Screens 491–495 are screen displays associated with an exemplary home automation application.

In an advantageous embodiment of the present invention, message controller 410 responds to any change in operating characteristics table 440 by determining one or more additional corresponding actions, if any, specified in either monitored equipment table 445 or User Entry Table 450 that must be executed in response to the given change in operating characteristics table 440. For example, if monitored equipment 422 changes the status of an alarm from "OFF" to "ON," message controller 410 changes one of the N data parameters in data parameter list 460 corresponding to the alarm. In response to the change in the value of the data or receipt of a "Transmit Alarm" command from monitored equipment 422, message controller 410 may automatically perform one or more subsequent actions specified in monitored equipment table 445. Similarly, message controller 410 may automatically perform one or more actions specified in user entry table 450 in response to data or commands entered by Subscriber 1 using user input device 415.

Figure 5:
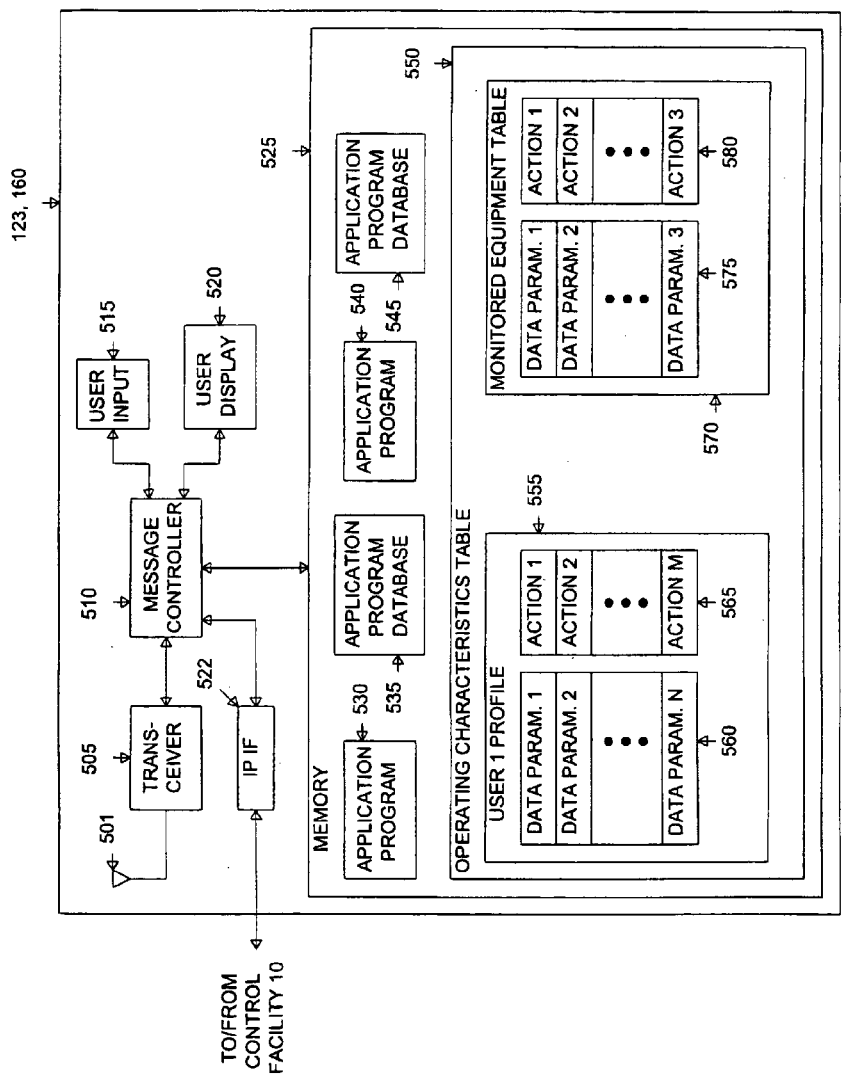
FIG. 5 illustrates an exemplary subscriber communication unit and/or an exemplary user device according to one embodiment of the present invention.

FIG. 5 illustrates exemplary subscriber communication unit (SCU) 123 and exemplary user device 160 according to one embodiment of the present invention. For the purpose of avoiding redundant description, the following description will be directed towards SCU 123, since many of the components in SCU 123 and user device 160 are identical. Where SCU 123 and user device 160 are different, the following description will so indicate.

SCU 123 comprises antenna 501, transceiver 505, message controller 510, user input 515, user display 520, and memory 525. Message controller 510, under the control of one or more application programs stored in memory 525, controls the overall operation of SCU 123, which in the illustrated embodiment is capable of performing telemetry applications and user applications such as electronic calendar programs, e-mail programs, and the like. User device 160 comprises an Internet protocol (IP) interface (If) that couples message controller 510 to Internet 150. User device 160 does not require transceiver 505 and antenna 501 since both are used for over-the-air (OTA) communications and user device 160 communicates primarily through Internet 150. The application programs performed by SCU 123 and/or user device 160 are counterpart applications to the application programs executed by SCU 124 and described above in FIGS. 3 and 4A.

Memory 525 contains application programs 530 and 540, application program databases 535 and 545, and operating characteristics table 440. Operating characteristics table 440 contains user profile 555, referred to hereafter as User 1 profile, and monitored equipment table 570. In the illustrated embodiment, monitored equipment table 570 contains data parameter list 575, which stores up to N data parameters, including Data Parameter 1, Data Parameter 2, and Data Parameter 3, and action list 580, which stores up to M executable actions defined for monitored equipment 422, including Action 1, Action 2 and Action 3. In the illustrated embodiment, User 1 Profile contains data parameter list 560, which stores up to N data parameters, labeled Data Parameter 1 through Data Parameter N. User 1 Profile also comprises action list 565, which stores up to M executable actions defined by Subscriber 1 and labeled Action 1 through Action M.

Each of application program 530, application program 540, application program database 535, and application program database 545 corresponds to one of application program 330, application program 430, application program database 335, or application program database 435 in FIGS. 3 and 4A. For example, as Subscriber 1 makes changes in operating characteristics table 340, message controller 310 automatically transmits command messages and/or data messages to message controller 510 to update corresponding information in application program database 535 and user profile 555 according to the user profile for Subscriber 1. Similarly, as monitored equipment 422 makes changes in operating characteristics table 440, message controller 340 automatically transmits command messages and/or data messages to message controller 510 to update corresponding information in application program database 545 and monitored equipment table 570 according to the profile information stored in monitored equipment table 445. In this manner, Subscriber 1's personal data, such as appointment schedules and e-mail, can be "synchronized" in SCU 123, SCU 124 and/or user device 160. Similarly, telemetry data and commands may be "synchronized" between SCU 123, SCU 124 and/or user device 160, and monitored equipment may be remotely controlled from SCU 123 or SCU 124 via wireless messaging network 100. Since each of SCU 123 and user device 160 contain copies of the user profile for Subscriber 1 and copies of the monitored equipment table for monitored equipment 422, either or both of SCU 123 and user device 160 also may perform subsequent actions as specified in the user profile or the monitored equipment table.

Figure 6:
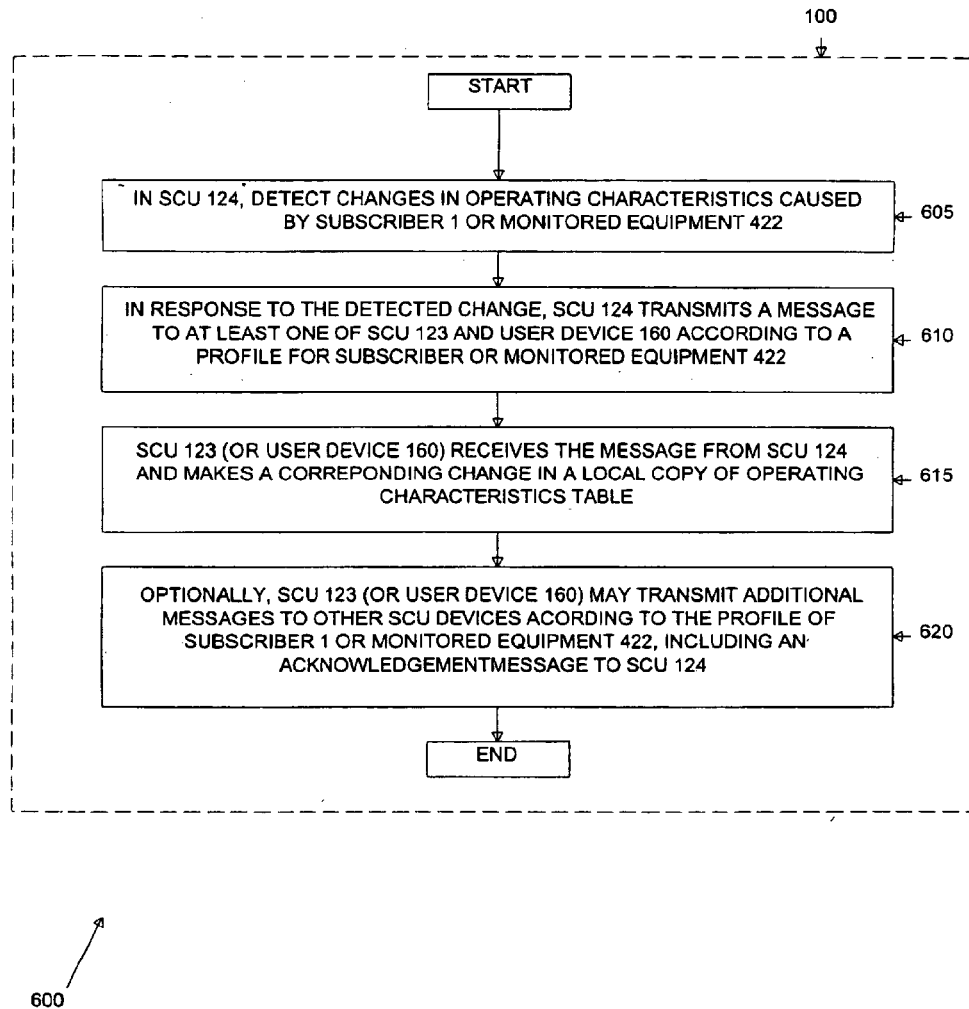
FIG. 6 is a flow diagram depicting the operation of two exemplary subscriber communication units in a wireless network according to one embodiment of the present invention.

FIG. 6 depicts flow diagram 600, which illustrates the operation of two exemplary subscriber communication units in wireless network 100 according to one embodiment of the present invention. In the ordinary course of operation, SCU 124 detects a change in one or more of the operating characteristics in the operating characteristics table, according to commands or data received from Subscriber 1 or monitored equipment 422 (process step 605). In response to the detected change, SCU 124 transmits a command message and/or data to SCU 123, user device 160, or both, and perhaps other subscriber communication units in wireless network 100. SCU 124 transmits to these other devices according to information stored in a user profile or a monitored equipment table in SCU 124 (process step 610).

Next, SCU 123 (or user device 160) receives the message transmitted by SCU 124 and makes a corresponding change in a local copy of the operating characteristics table (process step 615). Optionally, SCU 123 (or user device 160) may transmit one or more additional messages to other subscriber communication units according to a locally stored copy of the user profile or the monitored equipment table associated with SCU 124. These additional messages may include an automatic acknowledgment message sent to SCU 124 (process step 620).

Those of ordinary skill in the art should appreciate that they can readily use the disclosed conception and specific embodiments as a basis for designing or modifying other structures for carrying out the same purposes of the present invention. Those of ordinary skill in the art should also realize that such equivalent constructions do not depart from the spirit and scope of the present invention in its broadest form.

What is claimed is:

1. For use with a two-way wireless messaging system, an application controller distributed, at least in part, among a plurality communication units associated with said two-way wireless messaging system, said application controller capable of controlling cooperative communication among ones of said plurality of communication units in accordance with a prescribed application task, said application controller comprising:

a first communication unit controller that senses change in a characteristic monitored at a first communication unit, said monitored characteristic evaluated in accordance with said prescribed application task, and, in response thereto, automatically causes said first communication unit to transmit a first data signal;

an operations controller that analyzes said first data signal in accordance with said prescribed application task using at least one subscriber profile, and, in response thereto, causes a second data signal to be communicated automatically to at least a second communication unit; and a second communication unit controller that automatically analyzes said second data signal at said second communication unit, and, in response thereto, transmits an acknowledgment signal to at least said first communication unit.

2. The application controller set forth in claim 1 wherein said two-way wireless messaging system includes at least one base station that communicates with at least one of said first communication unit and said second communication unit.

3. The application controller set forth in claim 2 wherein said at least one base station comprises:

a transmitter that is capable of transmitting messages in a forward-channel having a first frequency range;

a receiver that is capable of receiving messages in a reverse-channel having a second frequency range; and an antenna that is capable of transmitting said forward-channel messages at a first angle of electrical downtilt below horizon and receiving said reverse-channel messages at a second angle of electrical downtilt, wherein said second angle of electrical downtilt is less than said first angle of electrical downtilt.

4. The application controller set forth in claim 1 wherein said second data signal is communicated automatically to said second communication unit and at least a third communication unit.

5. The application controller set forth in claim 4 wherein said second data signal is communicated concurrently to said second communication unit and said third communication unit.

6. The application controller set forth in claim 4 wherein said second communication unit transmits said acknowledgment signal to said first communication unit and said third communication unit.

7. The application controller set forth in claim 6 wherein said acknowledgment signal is transmitted concurrently to said first communication unit and said third communication unit.

8. The application controller set forth in claim 1 wherein said prescribed application task is one of a calendering task, an environmental monitoring task, an automation task, and a security task.

9. The application controller set forth in claim 4 wherein said prescribed application task is one of a calendering task, an environmental monitoring task, an automation task, and a security task.

10. The application controller set forth in claim 1 wherein said operations controller is associated with a data repository that maintains said at least one subscriber profile.

11. For use with a two-way wireless messaging system, an application controller distributed among at least three communication units associated with said two-way wireless messaging system, said application controller capable of controlling cooperative communication among said at least three communication units in accordance with a prescribed application task, said application controller comprising:

a first communication unit controller that:

senses change in characteristics monitored at a first communication unit, said monitored characteristics evaluated in accordance with said prescribed application task, and causes automatically, in response to one of said monitored characteristics exceeding an associated threshold, said first communication unit to transmit a first data signal;

an operations controller that analyzes said first data signal in accordance with said prescribed application task using a subscriber profile, and, in response thereto, causes a second data signal to be communicated automatically to at least a second communication unit and a third communication unit; and a communication unit controller that automatically analyzes said second data signal at each of said second communication unit and said third communication unit, and, in response thereto, transmits an acknowledgment signal to at least said first communication unit.

12. The application controller set forth in claim 11 wherein said two-way wireless messaging system includes at least one base station that communicates with at least one of said at least three communication units.

13. The application controller set forth in claim 12 wherein said at least one base station comprises:

a transmitter that is capable of transmitting messages in a forward-channel having a first frequency range;

a receiver that is capable of receiving messages in a reverse-channel having a second frequency range; and an antenna that is capable of transmitting said forward-channel messages at a first angle of electrical downtilt below horizon and receiving said reverse-channel messages at a second angle of electrical downtilt, wherein said second angle of electrical downtilt is less than said first angle of electrical downtilt.

14. The application controller set forth in claim 11 wherein said second data signal is communicated concurrently to said second communication unit and said third communication unit.

15. The application controller set forth in claim 11 wherein said second communication unit transmits said acknowledgment signal to said first communication unit and said third communication unit.

16. The application controller set forth in claim 11 wherein said prescribed application task is one of a calendering task, an environmental monitoring task, an automation task, and a security task.

17. The application controller set forth in claim 13 wherein said two-way wireless messaging system includes at least one gateway that enables at least one of said at least three communication units to communicate over said two-way wireless messaging system using a computer network.

18. The application controller set forth in claim 17 wherein said computer network is one of an intra network and the Internet.

19. The application controller set forth in claim 1 wherein said two-way wireless messaging system includes at least two antennas, each capable of transmitting forward-channel messages at a first angle of electrical downtilt below horizon and receiving reverse-channel messages at a second angle of electrical downtilt, wherein said second angles of electrical downtilt are respectively less than said first angles of electrical downtilt.

20. The application controller set forth in claim 19 wherein at least one of said at least three communication units is receiving forward-channel messages from a first one of said two antennas while transmitting interleaved reverse-channel messages to a second one of said two antennas, and said operations controller controls communication with said at least one of said communication units using said two antennas cooperatively.

21. For use with a two-way wireless messaging system, a method of operating an application controller that is distributed, at least in part, among a plurality of communication units associated with said two-way wireless messaging system, said application controller being capable of controlling cooperative communication among ones of said plurality of communication units in accordance with a prescribed application task, said method of operation comprising the steps of:

sensing change in a characteristic monitored at a first communication unit, said monitored characteristic evaluated in accordance with said prescribed application task;

causing, in response thereto, said first communication unit to transmit automatically a first data signal;

analyzing said first data signal in accordance with said prescribed application task using at least one subscriber profile, and causing, in response thereto, a second data signal to be communicated automatically to at least a second communication unit such that said analysis of said first data signal is performed remotely with respect to said second communications unit;

automatically analyzing said second data signal at said second communication unit; and transmitting, in response thereto, an acknowledgment signal to at least said first communication unit.

22. The method of operation set forth in claim 21 wherein said two-way wireless messaging system includes at least one base station and said method of operation comprises a further step of communicating with at least one of said first communication unit and said second communication unit using said base station.

23. The method of operation set forth in claim 22 wherein said at least one base station comprises an antenna, and said method of operation comprises the steps of:

transmitting forward-charnel messages from said antenna at a first angle of electrical downtilt below horizon; and receiving reverse-channel messages at said antenna at a second angle of electrical downtilt, wherein said second angle of electrical downtilt is less than said first angle of electrical downtilt.

24. The method of operation set forth in claim 21 wherein said two-way wireless messaging system includes two antennas, each antenna capable of transmitting forward-channel messages at a first angle of electrical downtilt below horizon and receiving reverse-channel messages at a second angle of electrical downtilt, said second angles of electrical downtilt are respectively less than said first angles of electrical downtilt, said method of operation comprising the steps of:

receiving at one of said first communication unit and said second communication unit forward-channel messages from a first antenna;

transmitting from said one of said first communication unit and said second communication unit reverse-channel messages to a second antenna; and controlling communication with said one of said first communication unit and said second communication unit using said two antennas cooperatively.

25. The method of operation set forth in claim 21 further comprising the step of communicating automatically said second data signal to said second communication unit and at least a third communication unit.

26. The method of operation set forth in claim 25 further comprising the step of communicating concurrently said second data signal to said second communication unit and said third communication unit.

27. The method of operation set forth in claim 25 further comprising the step of transmitting said acknowledgment signal from said second communication unit to said first communication unit and said third communication unit.

28. The method of operation set forth in claim 27 further comprising the step of transmitting concurrently said acknowledgment signal to said first communication unit and said third communication unit.

29. The method of operation set forth in claim 21 wherein said prescribed application task is one of a calendering task, an environmental monitoring task, an automation task, and a security task.

30. The method of operation set forth in claim 25 wherein said prescribed application task is one of a calendering task, an environmental monitoring task, an automation task, and a security task.

31. The method of operation set forth in claim 21 further comprising the step of maintaining said at least one subscriber profile in a data repository associated with said two-way wireless messaging system.

32. For use with a two-way wireless messaging system, a method of operating an application controller that is distributed, at least in part, among at least three communication units associated with said two-way wireless messaging system, said application controller being capable of controlling cooperative communication among said at least three communication units in accordance with a prescribed application task, said method of operation comprising the steps of:

sensing change in characteristics monitored at a first communication unit using a first communication unit controller, said monitored characteristics evaluated in accordance with said prescribed application task;

automatically causing, in response to one of said monitored characteristics exceeding an associated threshold, said first communication unit to transmit a first data signal;

analyzing said first data signal in accordance with said prescribed application task using an operations controller in association with a subscriber profile, and, in response thereto, causing a second data signal to be communicated automatically to at least a second communication unit and a third communication unit; and automatically analyzing said second data signal at each of said second communication unit and said third communication unit using a communication unit controller, and, in response thereto, transmitting an acknowledgment signal to at least said first communication unit.

33. The method of operation set forth in claim 32 wherein said two-way wireless messaging system includes at least one base station, and said method of operation further comprises the step of communicating with at least one of said at least three communication units using said base station.

34. The method of operation set forth in claim 33 wherein said at least one base station comprises an antenna, and said method of operation comprises the steps of:

transmitting forward-channel messages from said antenna at a first angle of electrical downtilt below horizon; and receiving reverse-channel messages at said antenna at a second angle of electrical downtilt, wherein said second angle of electrical downtilt is less than said first angle of electrical downtilt.

35. The method of operation set forth in claim 32 further comprising the step of communicating said second data signal concurrently to said second communication unit and said third communication unit.

36. The method of operation set forth in claim 32 further comprising the step of transmitting said acknowledgment signal from said second communication unit to said first communication unit and said third communication unit.

37. The method of operation set forth in claim 32 wherein said prescribed application task is one of a calendering task, an environmental monitoring task, an automation task, and a security task.

38. The method of operation set forth in claim 34 wherein said two-way wireless messaging system includes at least one gateway, and said method of operation further comprises the step of using said at least one gateway to enable at least one of said at least three communication units to communicate over said two-way wireless messaging system using a computer network.

39. The method of operation set forth in claim 38 wherein said computer network is one of an intra network and the Internet.

40. The method of operation set forth in claim 32 wherein said two-way wireless messaging system includes two antennas, each antenna capable of transmitting forward-channel messages at a first angle of electrical downtilt below horizon and receiving reverse-channel messages at a second angle of electrical downtilt, said second angles of electrical downtilt are respectively less than said first angles of electrical downtilt, said method of operation comprising the steps of:

receiving at one of said three communication units forward-channel messages from a first antenna;

transmitting from said one of said three communication units reverse-channel messages to a second antenna; and controlling communication with said one of said three communication units using said two antennas cooperatively.

* * * * *